(12) United States Patent
Sakaguchi et al.

(10) Patent No.: US 6,373,473 B1
(45) Date of Patent: *Apr. 16, 2002

(54) DATA STORAGE APPARATUS AND DATA RETRIEVAL METHOD IN SAID APPARATUS

(75) Inventors: Katsuhiko Sakaguchi, Kawasaki; Tsunekazu Arai, Tama; Keiji Takasu, Yokohama; Hiroto Yoshii, Tokyo, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/715,122

(22) Filed: Sep. 17, 1996

(30) Foreign Application Priority Data

Sep. 21, 1995 (JP) .............................. 7-242829

(51) Int. Cl.⁷ ................................. G09G 5/00
(52) U.S. Cl. ...................... 345/173; 345/179; 382/186; 707/6
(58) Field of Search ................................ 345/173, 179, 345/355, 441, 358, 167; 382/236, 179, 189, 187, 186; 707/216; 178/18.01, 19.01

(56) References Cited

U.S. PATENT DOCUMENTS

| 5,191,622 A | 3/1993 | Shojima et al. ............... 382/13 |
| 5,333,209 A | * 7/1994 | Sinden et al. .................. 382/13 |
| 5,528,701 A | * 6/1996 | Aref ............................. 382/178 |
| 5,579,408 A | 11/1996 | Sakaguchi et al. .......... 382/187 |
| 5,592,608 A | * 1/1997 | Weber et al. ................ 345/358 |
| 5,687,254 A | * 11/1997 | Poon et al. .................. 382/229 |
| 5,734,882 A | * 3/1998 | Lopresti et al. ............. 395/600 |
| 5,757,959 A | * 5/1998 | Lopresti ...................... 382/186 |
| 5,832,474 A | * 11/1998 | Lopresti et al. ................ 707/2 |

FOREIGN PATENT DOCUMENTS

| EP | 0635798 | 1/1995 |
| EP | 0649107 | 4/1995 |
| EP | 0686931 | 12/1995 |
| JP | 6-212424 | 6/1994 |
| JP | 7-73190 | 3/1995 |
| JP | 7-182446 | 7/1995 |
| JP | 7-334296 | 12/1995 |
| JP | 8-77190 | 3/1996 |

* cited by examiner

*Primary Examiner*—Almis R. Jankus
*Assistant Examiner*—Amr Awad
(74) *Attorney, Agent, or Firm*—Fitzpatrick, Cella, Harper & Scinto

(57) ABSTRACT

An operator uses a data input unit 1 to enter handwriting stroke data on a per-page basis. The entered strokes are stored by a memory unit 3. The operator sets key strokes, from among the stored stroke data, by means of a key-stroke setting unit 2. If key strokes are to be retrieved, a desired search stroke is entered from a search-stroke input unit 4. Retrieval means 5 compares the search stroke with each of the key strokes. If a key stroke that matches the search stroke is found, the page containing this key stroke is displayed as search results.

20 Claims, 15 Drawing Sheets

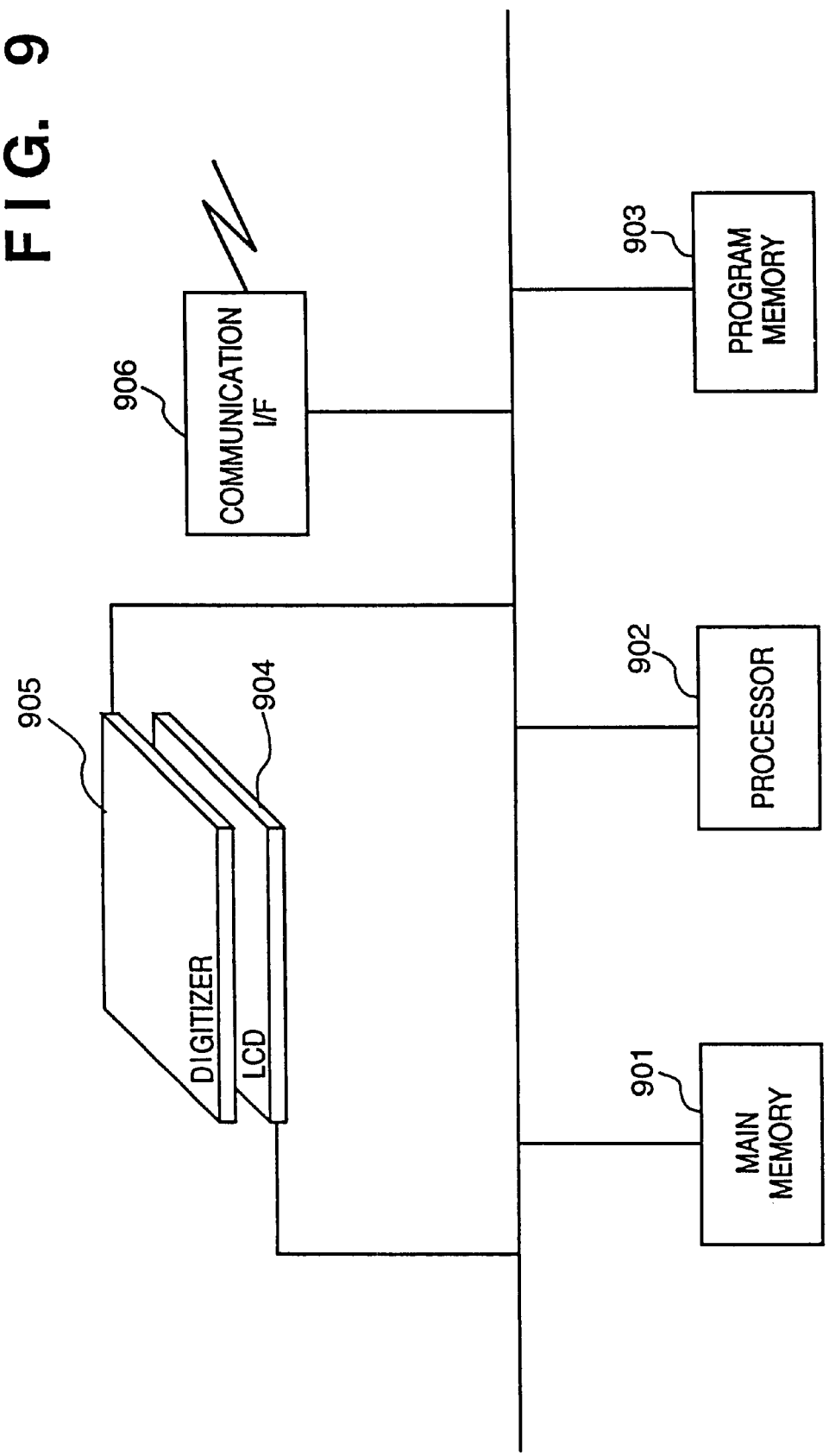

F I G. 11C
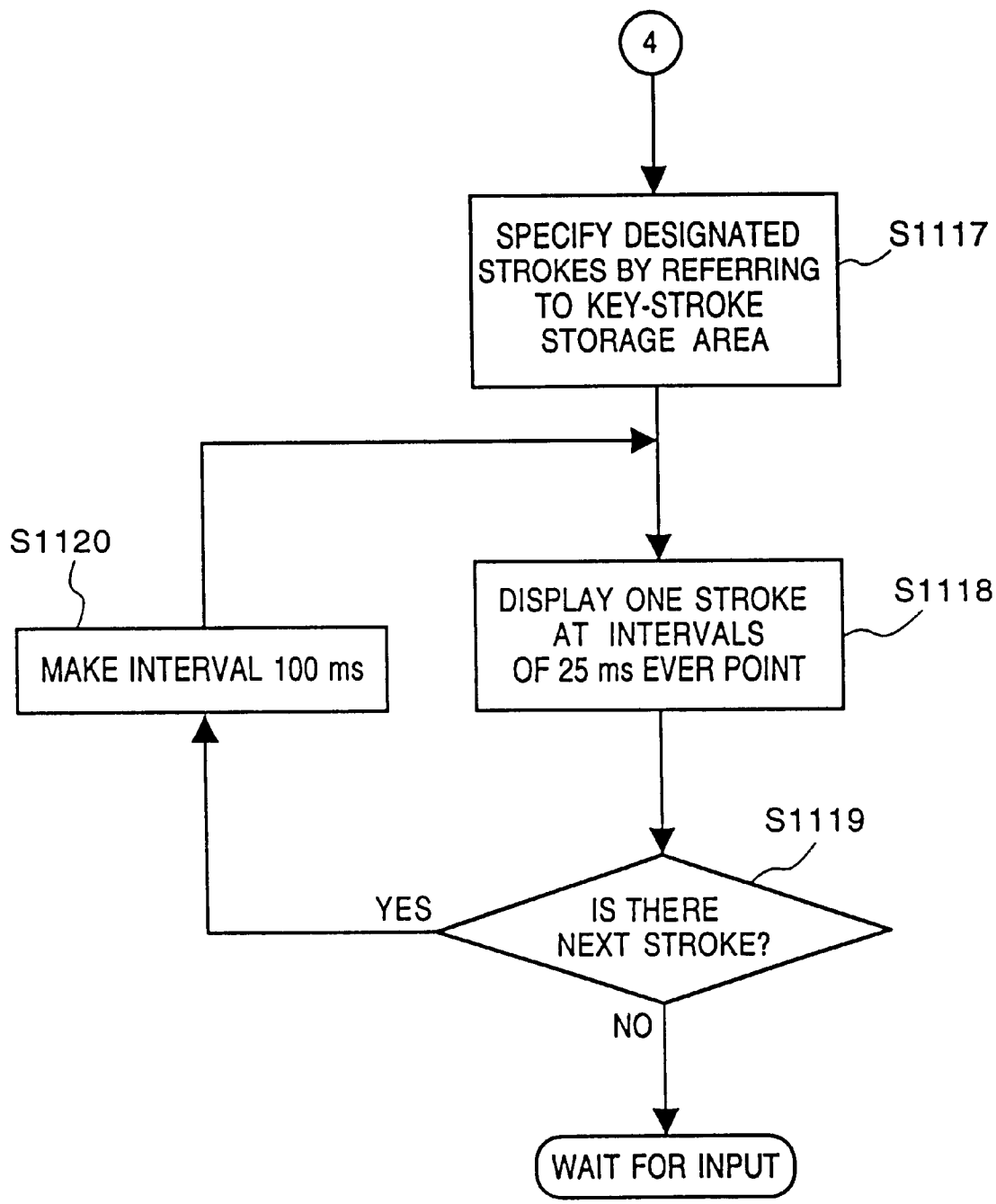

DATA STORAGE APPARATUS AND DATA RETRIEVAL METHOD IN SAID APPARATUS

BACKGROUND OF THE INVENTION

This invention relates to an electronic apparatus that is capable of entering handwritten strokes.

DESCRIPTION OF THE RELATED ART

A conventional handwriting data storage apparatus in which handwriting can be entered is capable of storing entered stroke information in such a manner that a memo or the like entered as handwriting can be stored. Such an apparatus may have a page-turning function or a function which makes possible retrieval by a title or keyword assigned to a memo.

The title or keyword assigned to a memo in the latter of these functions is composed of code information entered using a keyboard displayed on a screen or by means of handwriting character recognition. To perform a search, therefore, the search word is entered as code information in similar fashion using a keyboard or handwritten character recognition. This apparatus conducts the search by executing processing to match the search word or title with the keyword or title assigned to the memo.

Thus, in the example of the prior art described above, a keyboard must be used or character recognition must be carried out when setting the keyword or title to be assigned to the memo and when entering a search word. If entry is made from the keyboard, it is required to make physical use of a keyboard or to perform a special operation such as taking the trouble to call a keyboard displayed on a screen. This is very troublesome.

If entry is made using handwritten character recognition, entry is simpler than in the case of the keyboard but entries must be made while confirming that recognition is being performed correctly. This means that a troublesome operation is still unavoidable. In addition, since processing time is needed for recognition per se, the operator may become impatient when a quick response is sought.

Furthermore, since retrieval can be performed using code information, anyone who has learned the method of use or search keywords can retrieve data. If security is required, therefore, there is need of a troublesome operation such as the setting of a password separate from the keyword. In addition, since character code information is used, the object of a search is limited to characters and symbols that are dependent upon a character code table. This means that marks and abbreviated characters commonly employed in handwriting cannot be used.

SUMMARY OF THE INVENTION

The present invention has been devised in view the prior art described above and its object is to provide a handwriting data storage apparatus in which retrieval can be carried out using handwriting data without requiring the use of a keyboard or character recognition for the purpose of data retrieval.

According to the present invention, the foregoing object is attained by providing a first data storage apparatus comprising input means for entering stroke data, key-stroke setting means for setting a key stroke from the stroke data entered by the input means, memory means for storing the key stroke and the stroke data that have been entered by the input means in individual groups of predetermined units, retrieval means for retrieving a key stroke that matches a search stroke entered by the input means, and first search-result display means for displaying stroke data contained in a group corresponding to the key stroke found by the retrieval means.

In a preferred embodiment, the apparatus further includes key-stroke display means for displaying information relating to all key strokes that have been stored in the memory means, selecting means for selecting a desired key stroke from key strokes displayed by the key-stroke display means, and second search-result display means for displaying stroke data contained in a group corresponding to the key stroke selected by the selecting means.

A second data storage apparatus according to the present invention comprises a processor, a display unit, a coordinate input unit, a data memory for storing input data, and a program memory for storing a program executed by the processor, wherein the program memory includes a program code of an input step of entering stroke data and storing the stroke data in the data memory in individual groups of predetermined units, a program code of a key-stroke setting step of setting a key stroke from among the stroke data entered at the input step and storing the key stroke in the data memory group by group, a program code of a retrieval step of retrieving a key stroke that matches a search stroke entered at the input step, and a program code of a first search-result display step of displaying stroke data contained in a group corresponding to the key stroke found at the retrieval step.

In a preferred embodiment, the program memory further includes a program code of a key-stroke display step of displaying information relating to all key strokes that have been stored in the data memory, a program code of a selecting step of selecting a desired key stroke from keys strokes displayed at the key-stroke display step, and a program code of a second search-result display step of displaying stroke data contained in a group corresponding to the keystroke selected at the selecting step.

A method of retrieving data in a data storage apparatus according to the present invention comprises an input step of entering stroke data and storing the stroke data in memory means in individual groups of predetermined units, a key-stroke setting step of setting a key stroke from among the stroke data entered at the input step and storing the key stroke in the memory means group by group, a retrieval step of retrieving a key stroke that matches a search stroke entered at the input step, and a first search-result display step of displaying stroke data contained in a group corresponding to the key stroke found at the retrieval step.

In a preferred embodiment, the method further includes comprises a keystroke display step of displaying information relating to all keystrokes that have been stored in the memory means, a selecting step of selecting a desired keystroke from keystrokes displayed at the keystroke display step, and a second search result display step of displaying stroke data contained in a group corresponding to the keystroke selected at the selecting step.

In accordance with the data storage apparatus and retrieval method used in this apparatus described above, a search is conducted by stroke data. Consequently, a keyboard is unnecessary and handwriting data can be used in retrieval directly without the need for character recognition. As a result, data can be entered easily and searches can be conducted at high speed.

Further, with the disclosed apparatus and method, the operator is capable of retrieving easy-to-use symbols and abbreviated characters intuitively. This makes the apparatus and method very easy to use.

Furthermore, strokes may be combined freely. This means that a security function can be provided if strokes known only to a specific operator are used as key strokes.

Furthermore, by virtue of the fact that stored key strokes are displayed, key strokes can be utilized as an index.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9 is a diagram showing the hardware configuration of a pen-input information apparatus according to an embodiment;

FIGS. 11A–11C are flowcharts illustrating a processing procedure when information is entered by a pen in a second embodiment.

DESCRIPTION OF THE PREFERRED EMBODIMENTS

First Embodiment

An embodiment of the present invention will be described in detail with reference to the drawings.

Figure 1:
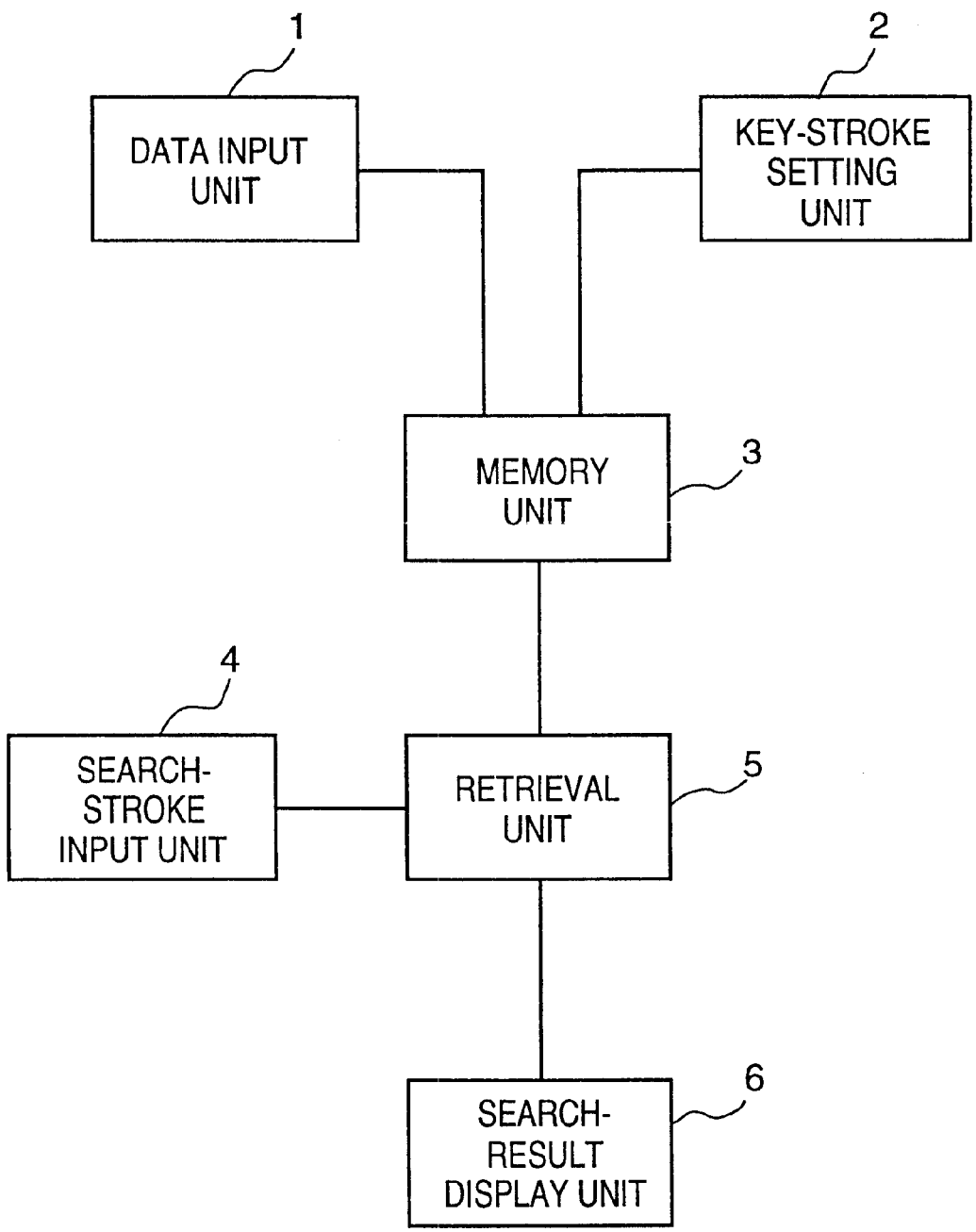
FIG. 1 is a functional diagram illustrating a first embodiment of the present invention.

FIG. 1 is a block diagram illustrating the functions of a pen-input information apparatus which best illustrates the characterizing features of the present invention. As shown in FIG. 1, the apparatus includes a data input unit 1 constituted by a digitizer or the like capable of entering stroke information. The entered stroke information is displayed on a display screen, which forms an integral part of the data input unit, and is stored in a memory unit 3. The stroke information referred to here is information on handwriting entered by the data input unit 1. More specifically, this is time-series coordinate point-sequence information obtained by sampling, at fixed time intervals, a segment of handwriting from the moment a pen is pressed down to the moment the pen is raised.

A key-stroke setting unit 2 is for specifying a key stroke, which is the object of a search, from a plurality of strokes already stored in the memory unit 3. The key stroke is composed of at least one stroke. (In order to avoid any confusion, it should be noted that the term "key" in "key stroke" does not mean the key of a keyboard but has the same meaning as the "key" in "keyword".) The memory unit 3 adopts a single screen of the display as a page unit and stores each page with the page number of this page serving as an index. Strokes that have been entered from the data input unit 1 are formed into groups on each page. Further, the memory unit 3 stores the stroke designated by the stroke setting means 2.

A search-stroke input unit 4 is used to enter a search stroke, which is for the purpose of retrieving the key stroke that has been set by the key-stroke setting unit 2. A retrieval unit 5 executes comparison processing to compare the search stroke, which has been entered by the search-stroke input unit 4, with a plurality of key strokes that have been stored in the memory unit 3. If the result of the comparison is that the search stroke is similar to a stored key stroke, the page index which includes the key stroke retrieved is outputted as the results of the search.

In a case where there are a plurality of key strokes that resemble the search stroke, a plurality of page indices are outputted as the results of the search. On the basis of a page index outputted by the retrieval unit 5, a search result display unit 6 causes the display screen to present a display of the information representing the page on which the retrieved key stroke resides. If there are a plurality of search results, the search result display unit 6 displays the pages of the search results successively in accordance with an indication from the operator. Further, in order to make the existence of a key stroke clear to the operator, whichever stroke among the strokes on a displayed page is the key has its display attribute, such as its color, changed.

FIG. 9 is a block diagram illustrating an example of a hardware architecture for implementing the function blocks of FIG. 1.

The setting of a key stroke by the key-stroke setting unit 2, the entry of a search stroke by the search-stroke input unit 4 or the retrieval by the retrieval unit 3 can be implemented by having a processor 902 execute a program stored in a program memory 903 shown in FIG. 9.

Further, the memory unit 3 in FIG. 1 is implemented by a main memory 901. The entry of a stroke or of a menu by the data input unit 1 or search-stroke input unit 4 can be carried out by a digitizer 905.

Furthermore, the display of entered data or search results can be presented by an LCD panel 904 underlying the digitizer 905, which is transparent. The LCD panel 904 and digitizer 905 have the same coordinate system and are so adapted that when a point is designated by the digitizer, a display of the point is presented so as to be superimposed on the designated point.

Figure 2:
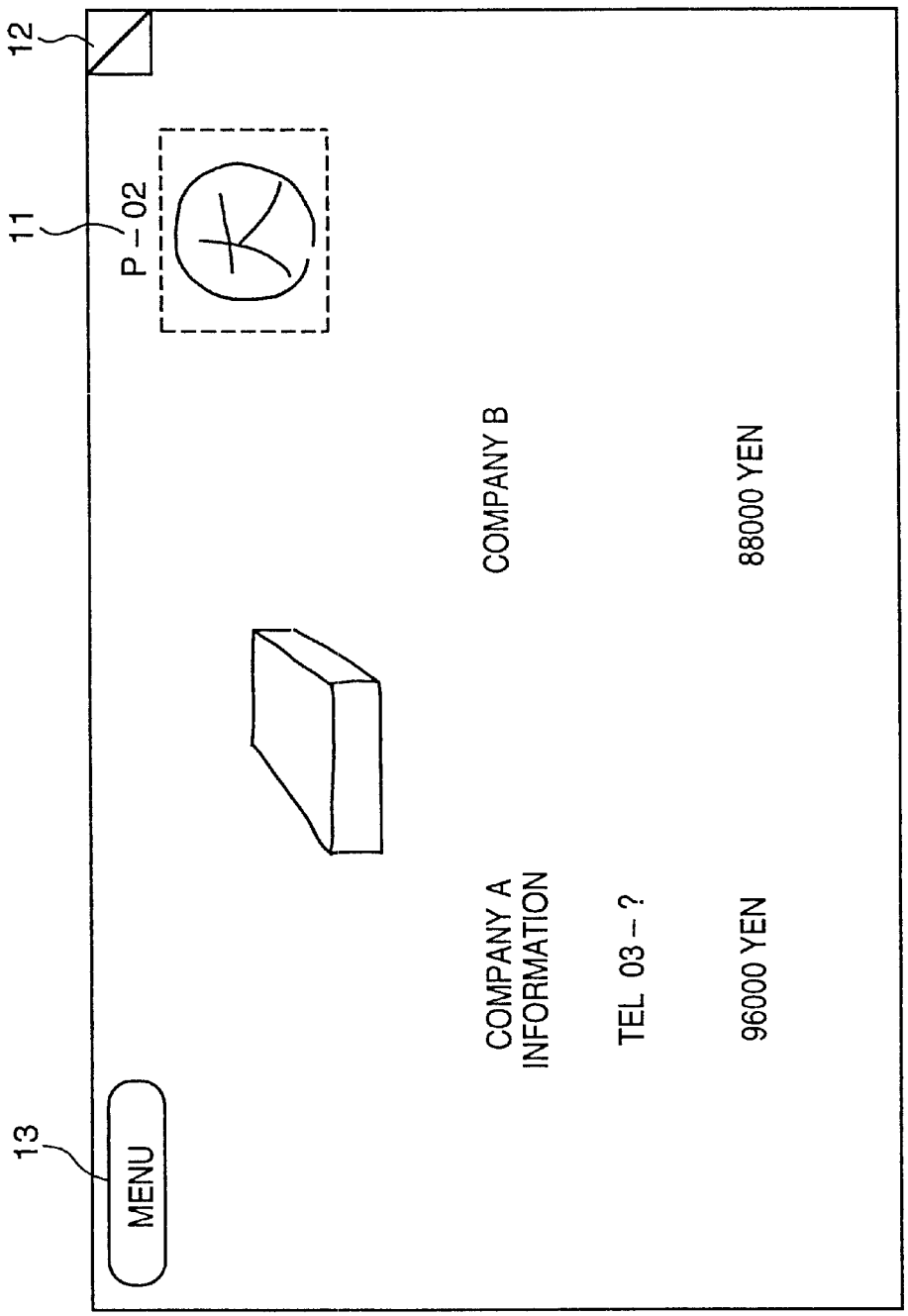
FIG. 2 shows an example of a data input screen for entering handwritten strokes in this embodiment.

FIG. 2 is a diagram showing an example of an input display screen for handwriting strokes entered from the data input unit 1 illustrated in FIG. 1. A single input screen thus presented is treated as a single page unit. Numeral 11 in FIG. 2 denotes the page number and is a page index indicating which page the currently displayed page is. A page-turning portion 12 is an on-screen button which changes the screen to the previous page or to the next page. By pressing this portion of the screen with a pen, the operator can cause the screen to change to the previous page or to the next page.

A menu button 13 is an on-screen button which, by being pressed, makes it possible to select one of three modes, namely a "key-stroke designation model", a "data input mode" or a "search-stroke input mode".

The "page" mentioned here is the "page unit" referred to in the description of the memory unit 3 shown in FIG. 1. A plurality of strokes such as displayed on the screen in FIG. 2 are stored as grouped information and displayed as search results.

Figure 3:
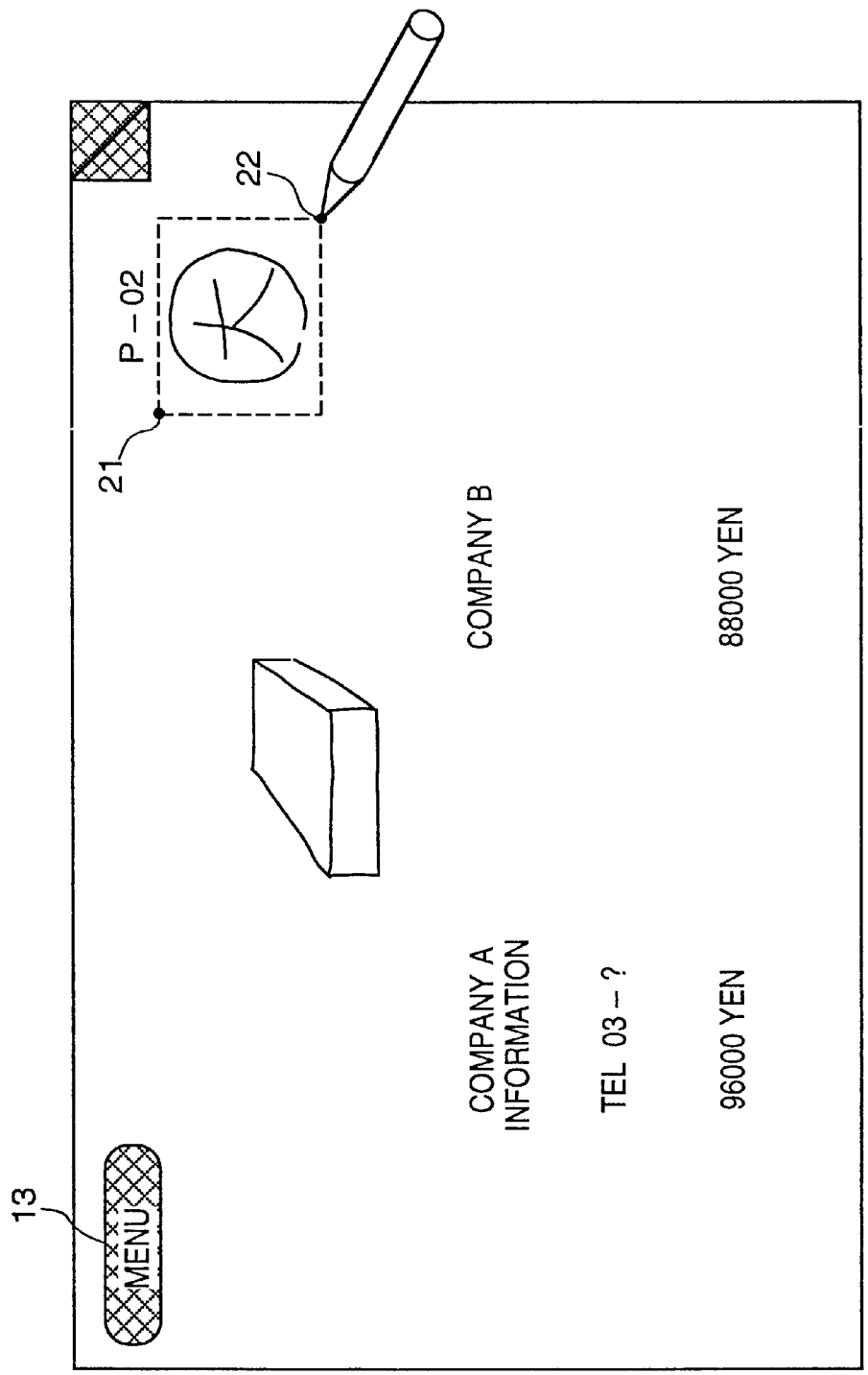
FIG. 3 shows an example of a setting screen for setting key strokes in this embodiment.

FIG. 3 shows an example of a screen on which key strokes are being designated by the key-stroke setting unit 2. To make the transition from the data input screen of FIG. 2 to the key-stroke designating screen of FIG. 3 in this embodiment, the operator changes over the mode by pressing the menu button 13 of FIG. 2. To designate strokes, first the operator presses a pen down on a position 21 and then lifts the pen at position 22. As a result, a diagonal line of a rectangular area is specified by the positions 21 and 22. The stroke data contained inside the rectangular area decided by the diagonal line is specified as the key strokes. In the example of the screen shown in FIG. 3, four strokes constructing the character "㊝" are specified as the key strokes. The method of designating key strokes is not limited to that of this embodiment; it will suffice if a specific stroke from among a plurality of strokes displayed on the screen is capable of being designated. It is possible to apply various stroke designating methods such as are employed in the graphics applications of information devices that use a mouse or pen.

Figure 4:
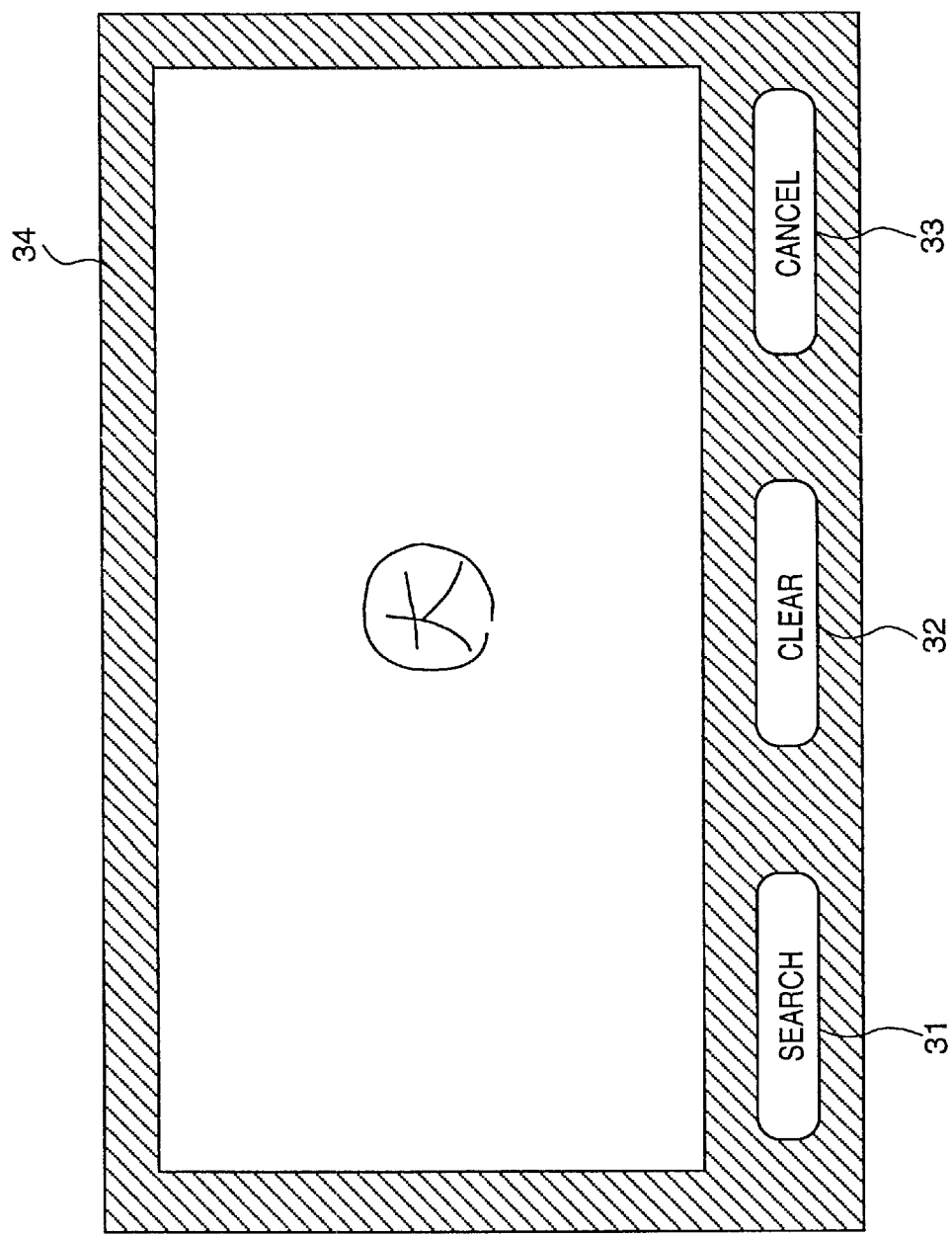
FIG. 4 shows an example of an input screen for entering search strokes in this embodiment.

FIG. 4 shows an example of an input screen for entering search strokes. A search is executed by pressing a search button 31. A clear button 32 is an on-screen area for erasing already written search strokes when it is desired to rewrite a search stroke input. A cancel button 33 is an on-screen area for canceling entry of search strokes. An area 34 serves as the area for entering search strokes.

Entry of search strokes is carried out in the form of handwriting in the manner illustrated. In this embodiment, no comparison is made with regard to size or position of strokes; only the shapes of strokes and the order in which they are entered become the objects of comparison in a search. This is related to a matching method, described later, and does not impose a limitation upon the invention.

Figure 5:
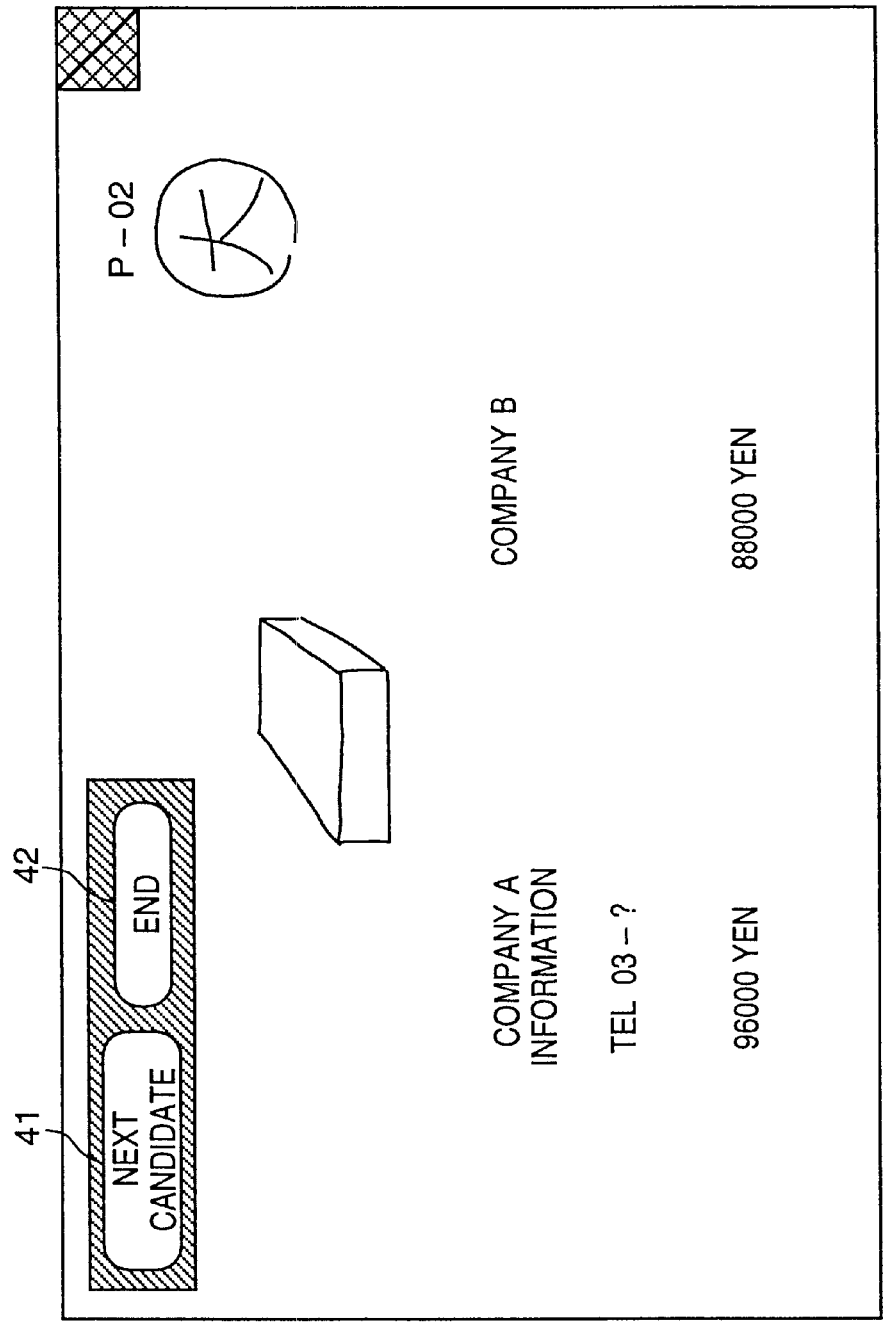
FIG. 5 shows an example of a display screen for displaying search results in this embodiment.

FIG. 5 shows an example of a display screen for displaying search results. More specifically, the screen displays the search results obtained when a search is conducted by pressing the search button 31 in FIG. 4. If search results take up a plurality of pages, a next-candidate button 41, which is for presenting a display of the next retrieved page, is displayed on the screen. If search results are satisfactory, the operator presses an end button 42.

If the end button 42 is pressed, the screen being displayed as the search results is presented in the form of the data input screen. If there is no next-candidate button or if there are no search results obtained, a message to this effect is displayed to so inform the operator. Further, in the example of FIG. 5, the display of the key strokes which are the object of the search appears in the form of bold lines to distinguish it from the display of other strokes.

Figure 6:
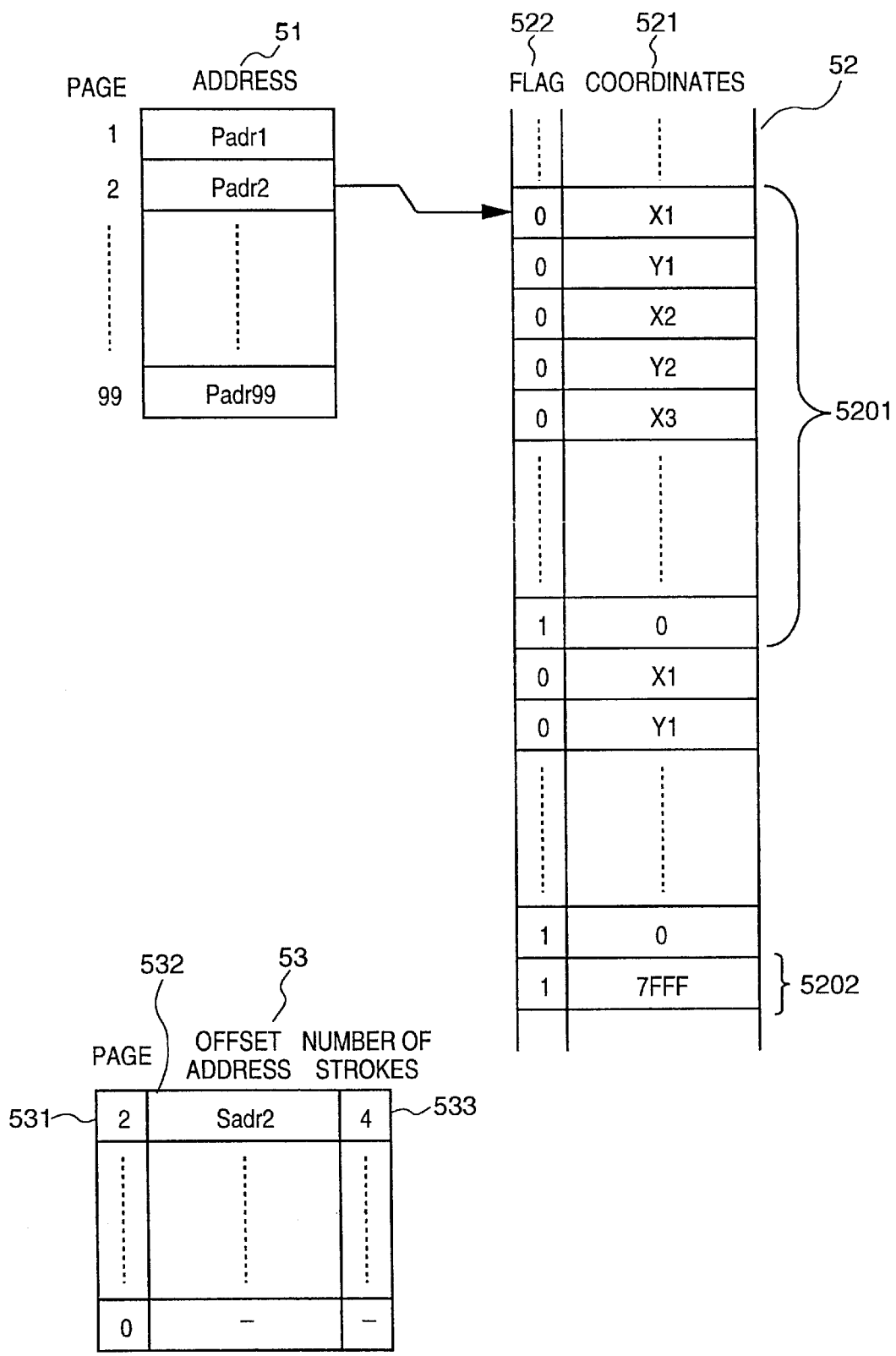
FIG. 6 is a diagram illustrating the relationship among a page index table, stroke information and key stroke information in this embodiment.

FIG. 6 is a diagram in which the relationship among the stroke information in page units stored in the memory unit 3, the page indices and the key strokes is illustrated in readily understandable form. As shown in FIG. 6, starting addresses of stroke data on pages from a first page to a 99th page are stored in an page index table 51. In this embodiment, page information consists solely of strokes. However, code information and image information such as bitmap information can be mixed with the strokes. In such case the address information of a page index should be provided with regard to each type of data on a per-page basis.

An area 52 in FIG. 6 is an area which stores the stroke information contained on a page. The stroke data on the second page is illustrated in example shown in FIG. 6. A block 5201 in the stroke information storage area 52 represents the data of one stroke. The coordinate data in each stroke are represented by 15-bit numerical data 521 and a 1-bit stroke-end flag 522 for each of x and y.

The last item of data of one stroke is "1", which indicates that the flag 522 is ON, as illustrated in FIG. 6. An end block 5202, which indicates page end, is present at the end of a succession of a plurality of these blocks. The stroke-end flag in this last block of data is ON and the data portion is "7FFF" in hexadecimal notation. This makes it possible to determined the end of a page.

An area 53 in FIG. 6 is a storage area for the keystroke information. The key strokes on a page indicated by a page index number 531 are indicated by an offset address 532 of stroke information and stroke number 533, namely the number of strokes constructing the key strokes. The offset address 532 is an offset from an address stored in the table 51 to the block of a key stroke in regard to a page indicated by the page index 531.

In a case where the page index number 531 is "0", this column is treated as information indicating the end of a key-stroke information area.

Figure 7:
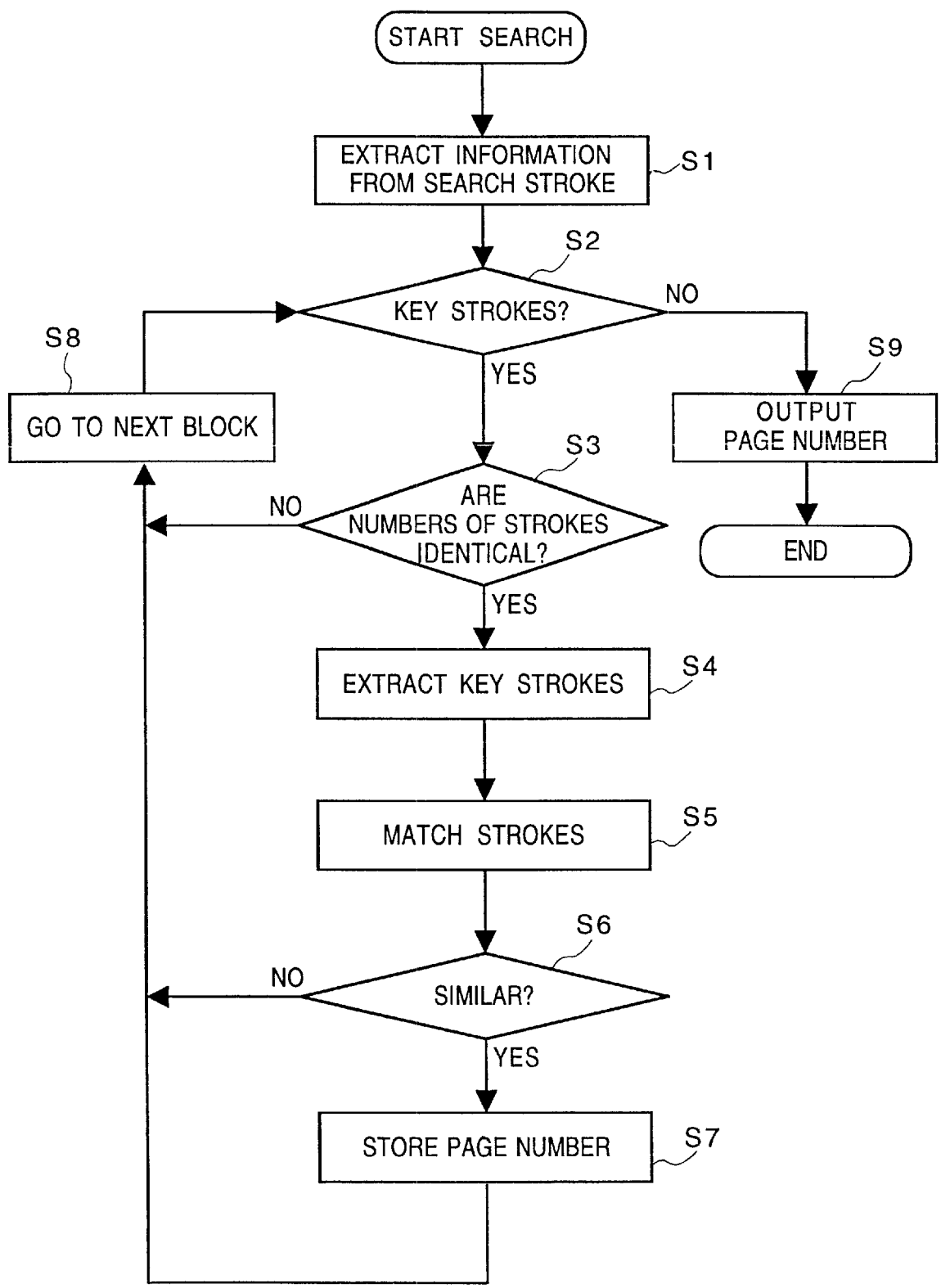
FIG. 7 is a flowchart of processing illustrating operation when a search is conducted.
Figure 10A:
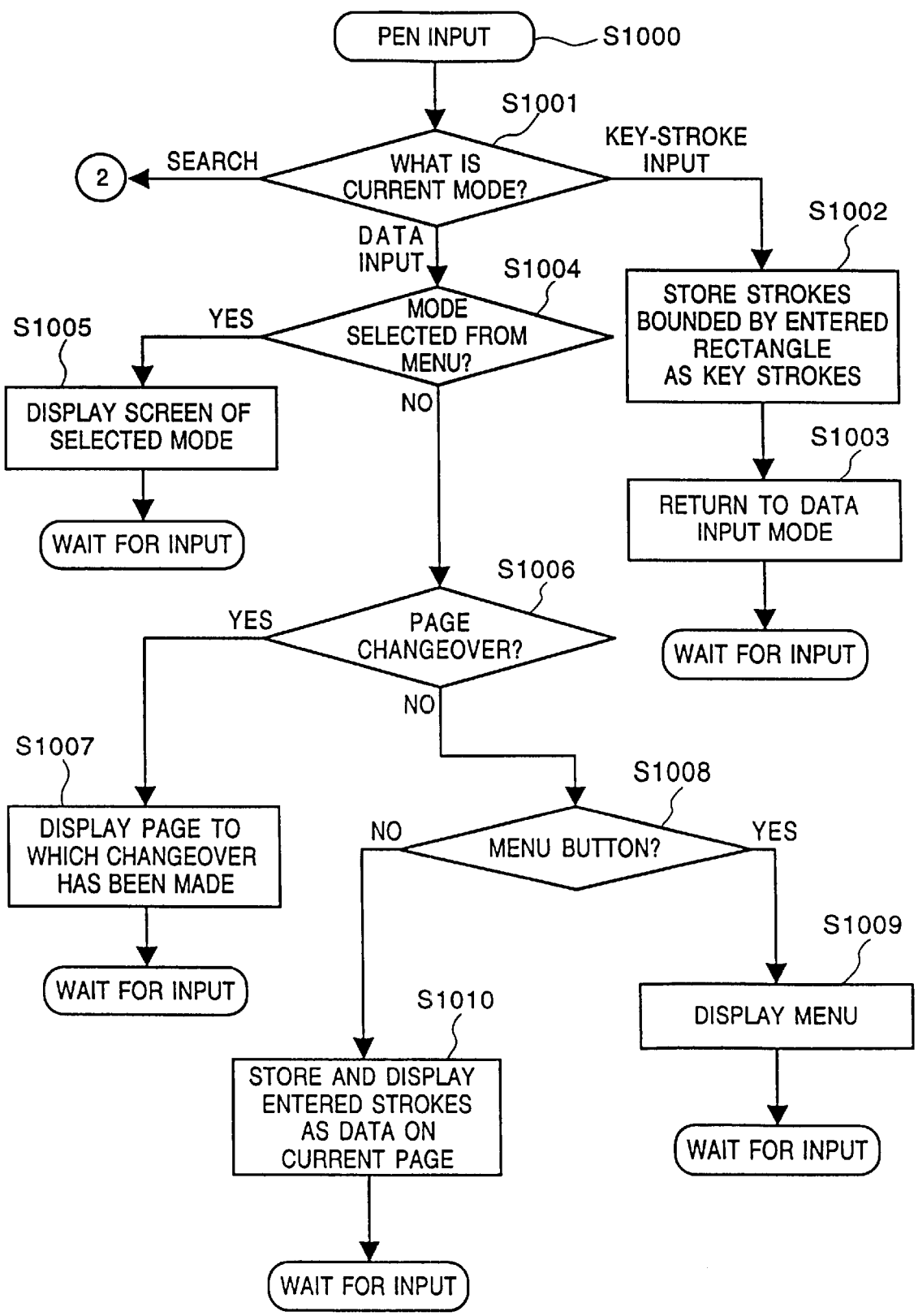
FIGS. 10A, 10B are flowcharts illustrating a processing procedure when information is entered by a pen in the first embodiment.
Figure 10B:
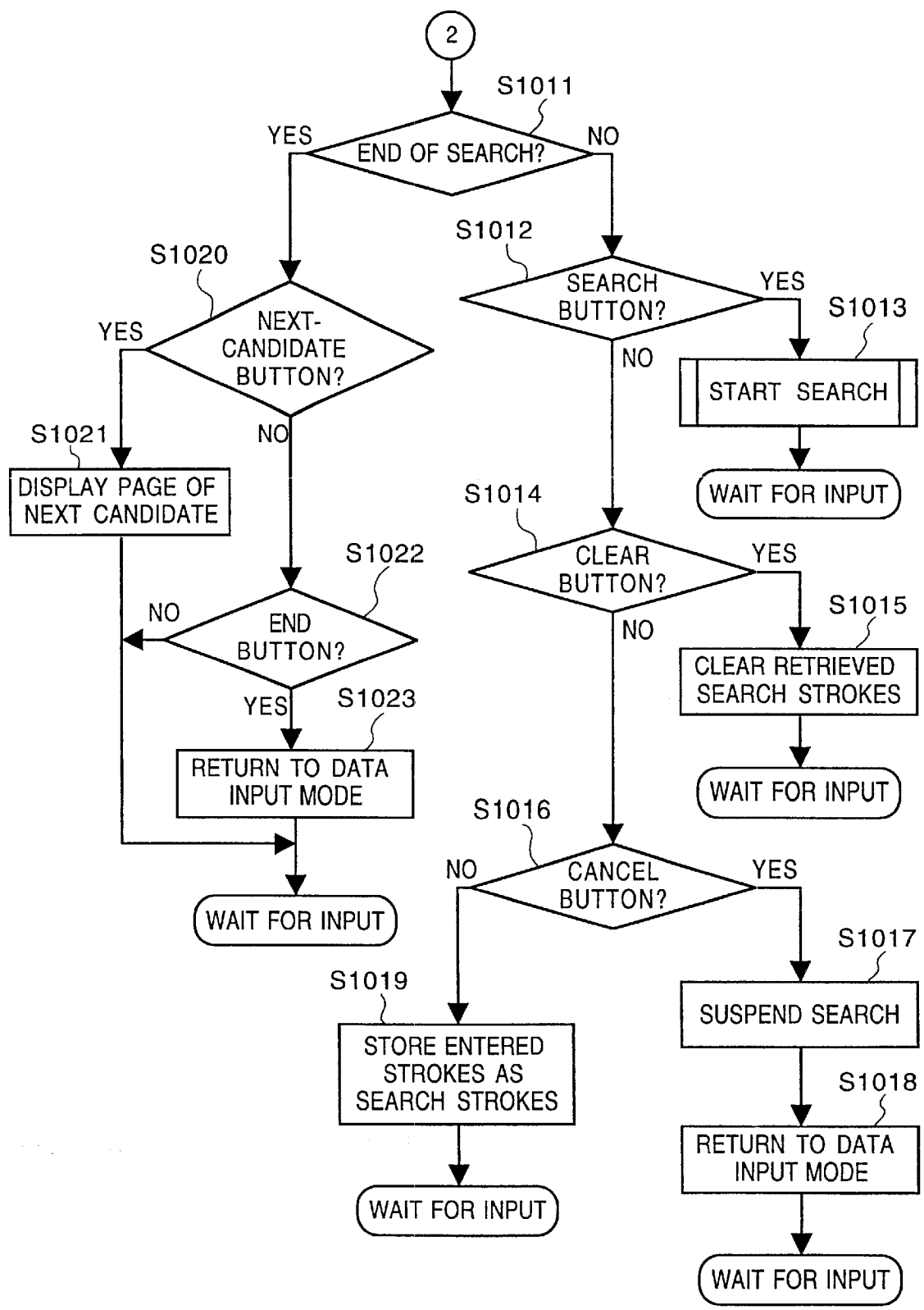

FIG. 7 and FIGS. 10A, 10B are flowcharts illustrating the details of the operation described above.

FIGS. 10A, 10B are flowcharts illustrating an operating procedure implemented with regard to a page (current page) displayed on the screen. In the processing of FIGS. 10A, 10B, the action of pressing down the pen and lifting the pen is adopted as a single pen input, and the processing is started in response to such an input.

If there is an input, the present mode is discriminated at step S1001 in FIG. 10A. If the present mode is the search mode, the program branches to step S1011 in FIG. 10B. If the input is a key stroke, the program proceeds to step S1002. Here strokes bounded by the entered rectangle are found from the stroke information area 52 of the current page. The stroke information found is stored in the key-stroke storage area 53. More specifically, the addresses and number of strokes found are stored, together with the current page number, in the key-stroke storage area 53 as the key strokes. The data input mode is then restored and the apparatus waits for an input.

If the current mode is the data input mode, it is determined at step S1004 whether the input is selection of a mode from a menu. If such is the case, then the program proceeds to step S1005, at which a screen conforming to the selected mode is displayed. More specifically, the screen of FIG. 2 is displayed if the mode is the data input mode, the screen of FIG. 3 if the mode is the key-stroke input mode and the screen of FIG. 4 if the mode is the search mode. If the input is not selection of a mode, it is determined at step S1006 whether the input is that for designating page changeover. If the answer is "YES", then, depending upon the designation made, the current page is changed to the immediately preceding page or to the immediately following page at step S1007. If the input is not that for designating page changeover, it is determined at step S1008 whether the menu button has been pressed. If the menu button has been pressed, then selectable modes are displayed as a menu at step S1009.

If no button is pressed in the data input mode, this means that the entered data are indicative of a stroke on the current page. Accordingly, a coordinate point-sequence constructing the entered stroke is stored in the stroke information area 52 and a display is presented in the form entered. If data is added to an existing page at such time, the data on successive pages is shifted as needed to acquire a vacant area. If a page is a new page, the address of the stroke information is stored in the page index table 51 after the stroke information is stored, and then the address is correlated with the page.

If the mode is the search mode, it is determined at step S1011 whether the search has ended. If the search has not ended, then it is determined at step S1012 whether the search button 31 has been pressed. If the search button 31 has been pressed, then a search is conducted at step S1013. This procedure is described in detail in FIG. 7. If the search button 31 has not been pressed, then it is determined at step S1014 whether the clear button 32 has been pressed. If the answer is "YES", then an entered search stroke is cleared at step S1015. If the answer is "NO", then it is determined at step S1016 whether the cancel button 33 has been pressed. If the cancel button 33 has been pressed, then search currently being conducted is canceled at step S1017 and the data input mode is restored at step S1018.

If no button is pressed in the state which prevails prior to a search, then a stroke that has been entered is judged to be a search stroke. The entered stroke is stored as a search stroke at step S1019.

In a case where an input is made after a search, it is determined at step S1020 whether the next-candidate button 41 has been pressed. If the answer is "YES", then the page that is the next candidate is displayed at step S1021. If decision at step S1020 is "NO", then it is determined at step S1022 whether the end button 42 has been pressed. If the answer is "YES", then the data input mode is restored at step S1023.

By virtue of the foregoing procedure, entry of a stroke, definition of a key stroke and page retrieval based upon the stroke data can be performed depending upon the input made. It should be noted that the data input unit 1, key-stroke input unit 2, search-stroke input unit 4 and retrieval unit 5 are blocks which perform the functions corresponding to the modes determined at step S1001. These blocks execute the processing of steps S1004~S1010, steps S1002~S1003 and steps S1004~S1019.

Next, operation at the time of a search will be described in detail with reference to FIG. 7.

First, at step S1 in FIG. 7, simple extraction of features from an entered search stroke is carried out. In this example, only the number of strokes is extracted. Next, at step S2, the page index 531 of the key-stroke storage area 53 is checked and it is determined whether the index is "0", which indicates block end. If the result is "0", then the program proceeds to step S9.

If block end is not found at step S2, the program proceeds to step S3. Here the number of strokes determined at step S1 is compared with the stroke number 533 in the key-stroke storage area 53. If the numbers of strokes compared are not the same, the program proceeds to step S8, at which processing shifts to the next key-stroke block. The program then returns to step S2.

If the numbers of strokes are found to be the same at step S3, then the program proceeds to step S4. The offset address of the storage area 533 of key-stroke information is extracted and the offset address is added to the address obtained from the page index table 51 on the basis of the page index number 531. The block of this address is extracted as a key stroke from stroke information contained in the stroke information area 52. At this time the stroke number 533 stored in the key-stroke information 53 is extracted and placed in the buffer in order to match only the data indicative of the value of this number. Next, at step S5, matching is performed between the search stroke and the extracted key stroke. The matching method employs a well-known stroke-vector matching technique used widely in on-line handwritten character recognition. The method used in this embodiment will be described below in simple terms.

First, individual strokes are divided into ten equal segments and each segment is converted to eight-direction vector representation. The thus converted search strokes and key strokes are each compared in terms of (10*stroke number) vector representation and a penalty is enlarged in conformity with a deviation in such a manner that strokes whose vectors are exactly the same are given a penalty of "0", strokes one of whose eight-direction vectors deviates are given a penalty of "1", and so on. The penalties are added up while all stroke vectors are compared. The total penalty, which is the final result, is thus obtained.

On the basis of the penalty thus determined, degree of similarity is judged at step S6. Perfectly matching strokes naturally have a penalty of "0". However, since the form of a handwritten character differs slightly every time it is written, as a matter of course, a penalty is allowed to a certain degree. Changing the amount of allowance makes it possible to adjust the laxity of a search. In this embodiment, a penalty of ten points per stroke is allowed. If the penalty is less than ten points, then it is judged that the compared strokes resemble each other. For example, in the case of the search shown in FIG. 4, there are four search strokes. Owing to the fact that a total of 40 vector representations are compared, the maximum amount of penalty allowed is 40 points.

In this embodiment, as described above, matching of stroke vectors is used. However, equivalent results are obtained even when a well-known feature-point extraction method is applied. The present invention is not dependent upon the matching method. As long as the degree of similarity of strokes can be judged, any technique may be used.

In this embodiment, strokes are judged to resemble each other using a penalty allowance of 40 points in the example of FIG. 4, as mentioned above. If strokes are judged not to resemble each other at step S6, then the program proceeds to step S8. Here the next key stroke is taken as the stroke of interest and the processing from step S2 onward is repeated.

If compared strokes are found to be similar at step S6, then the program proceeds to step S7, at which the page number of this key stroke is stored temporarily, and then to step S8, at which the next key stroke is taken as the stroke of interest and the processing from step S2 onward is repeated.

When examination of all key strokes is finished by executing processing in this fashion, it is found at step S2 that there are no key strokes left and the program proceeds from step S2 to step S9, at which the page number stored at step S7 is outputted to the display means for the next search result and all search processing is terminated. If the page retrieved at step S7 does not exist, page number 0 is outputted and processing is ended.

Search results are displayed in the manner shown in FIG. 5 on the basis of the page number outputted by the above-described processing. If the outputted page is "0", a message to the effect that the object of the search could not be found is outputted. The foregoing operation makes it possible to furnish a user with a page search based upon strokes.

In this embodiment, stroke matching employs vector matching, the conditions limiting search strokes in this case are set to be extremely liberal and so are the matching conditions. As a result, strokes coincide fairly easily. Accordingly, though a page retrieved by search strokes is fairly easy to find, there is also the possibility that pages not sought will also be outputted fairly often. If it is felt that a search has been given too much latitude, the conditions at the time of matching can be adjusted, as mentioned earlier. By setting the optimum conditions, therefore, it is possible to conduct a search in accordance with the desired conditions. In actuality, no practical problems arise if adjustments are made skillfully at the time of development or if it is so arranged that the user can adjust the conditions.

Furthermore, in this embodiment, the processing speed is high because the numbers of strokes are compared before matching is performed. If this comparison of numbers of strokes is eliminated, the processing speed will decline but then it will not matter if the number of key strokes and the number of search strokes change. If the matching method relies solely upon the matching of feature points, it will be possible to eliminate a limitation upon the order in which strokes are written.

Thus, it is possible to adjust search limitations in a variety of ways so that the user can select the optimum search limitations desired.

Further, in this embodiment, the setting of key strokes is implemented by designating any stroke entered as data. As a result, some of a plurality of items of data can be used also as key strokes and a plurality of key strokes can be provided on the same page. The result is a highly versatile search apparatus that is easy to use.

In this embodiment, a page changeover function is provided. However, if it is so arranged that a key stroke is set at all times in a case where a new page is created without the provision of this function, it will be possible for the operator to control security by using ordinary symbols or characters or by employing marks or abbreviated characters known only to the operator.

In this embodiment, the data stored on one page are composed solely of stroke data. Besides stroke data, however, character code information and image information such as a bitmap can also be added to page data without departing from the gist of the present invention.

Second Embodiment

In the second embodiment, the arrangement of the first embodiment is further provided with means for display key strokes. Accordingly, FIGS. 1 through 7, FIG. 9 and FIG. 10B can be used in the second embodiment as well and elements identical with those of the first embodiment need not be described in detail again. However, the content of the menu described in FIG. 2 onward is added to the second embodiment. Further, a "key-stroke display mode" is added to the modes checked at step S1001 in FIG. 10A.

More specifically, "key-stroke display" is added to the menu displayed by designating the menu display in FIG. 2. A key-stroke display screen shown in FIG. 8 is displayed by designating this key-stroke display.

Figure 8:
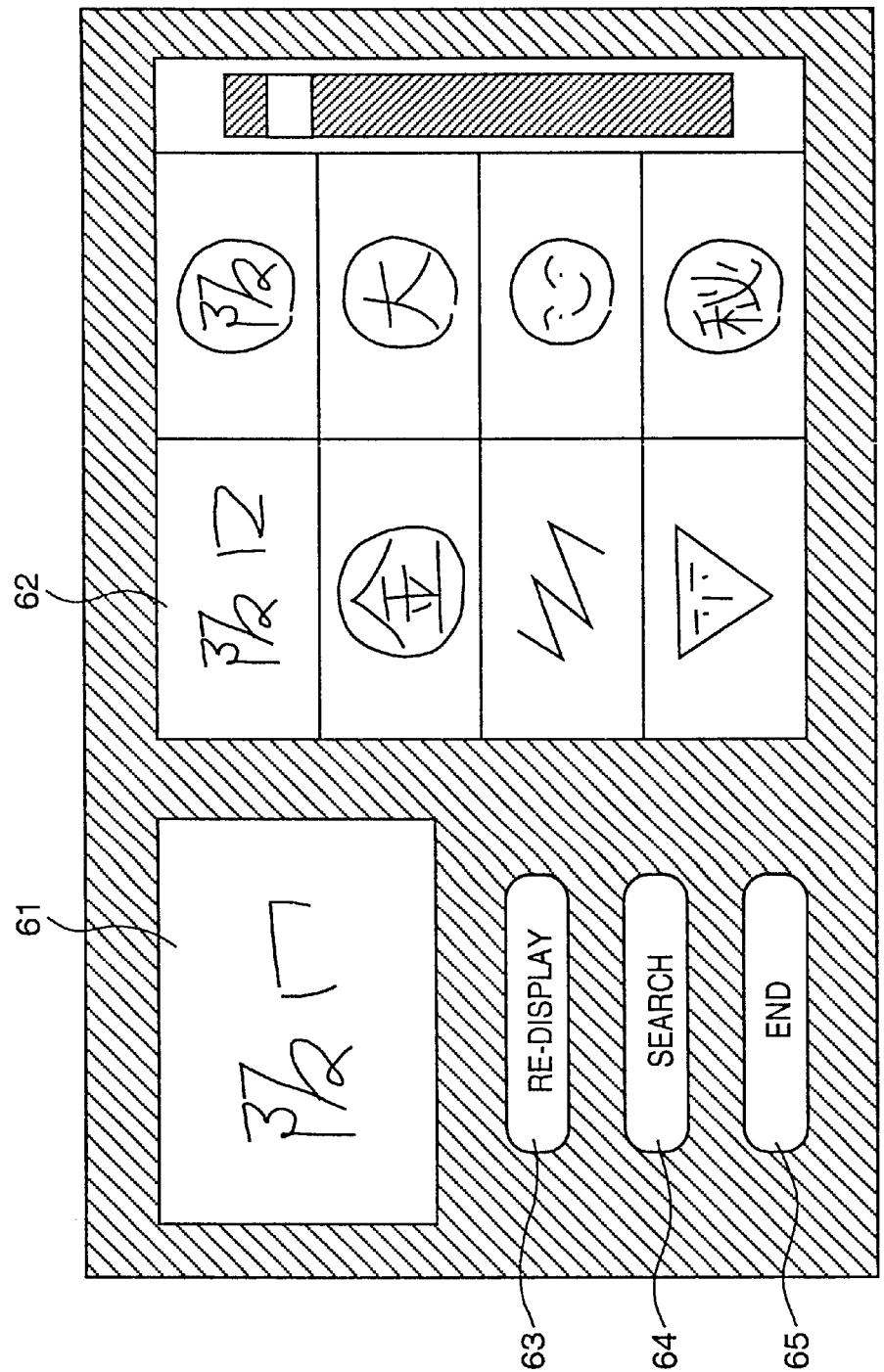
FIG. 8 shows an example of a keystroke display screen illustrating a second example of practicing the present invention.

Key strokes selected in a key-stroke display area 62 are displayed in time-series fashion in a display area 61 in FIG. 8 just as if they were written by a human being. All currently set key strokes are displayed in the key-stroke display area 62. A scroll bar and arrows for designating up/down-scrolling are displayed on the right side of area 62. The scroll bar and arrows are used when all key strokes cannot be displayed within the limits of the area 62.

Key strokes can be selected from the displayed key-stroke area 62 by pressing the desired key strokes with a pen. The key strokes that have been selected are displayed in the key-stroke display area 61 in time-series fashion so that the order in which the strokes were written can be understood. The size of displayed strokes is optimized by a coordinate transformation so as to fit in the display area 61.

When a re-display button 63 is designated, the key strokes already being displayed in the key-stroke display area 61 are erased and then displayed again in the manner of a time series. When a search button 64 is designated, page information containing the key strokes displayed in the display area 61 is retrieved. It is possible to perform a search using these key strokes as an index without the operator entering handwritten key strokes in the manner of the first embodiment. When an end button 65 is designated, this screen is terminated and the data input screen of FIG. 2 re-appears.

The operation of this embodiment will be described with reference to FIG. 6, FIG. 8 and FIGS. 11A~11C. First, in order to display key strokes in the key-stroke selection area 62 of FIG. 8, the key-stroke storage area 53 of FIG. 6 is checked and key-stroke data area fetched until the page number becomes "b 0". This processing is exactly the same as the processing of steps S2 and S4 in FIG. 7, described in connection with the first embodiment.

The coordinate information of each key stroke thus extracted undergoes a translation and a similar transformation of its coordinates in such a manner that the position and size will conform to the display area 61. The strokes thus transformed are displayed in the key-stroke selection area 62. The key strokes selected from the selection area 62 also undergo a coordinate transformation so that the position and size of the strokes will conform to the display area 61.

The processing thus far is similar to that of the case where strokes are displayed in the display area 62. However, the display method differs from that of the first embodiment. Strokes usually are displayed by a plurality of straight lines connecting each of the coordinate points. However, with regard to the display in area 62, a plurality of line segments connecting each of the coordinate points need not be displayed at one time. The strokes may be displayed in the order in which they where entered while a fixed pause is provided for each line segment. The order in which the strokes were written is memorized by storing the strokes in the stroke storage area 52 in the order of entry.

In the case of this embodiment, a pause interval of about 25 ms is provided for each line segment. Furthermore, a pause of amount 100 ms is inserted between strokes. As a result, it is possible to ascertain the order in which key strokes were written as well as the direction from which they were written.

With regard to the search operation when the search key 64 is pressed, treatment is exactly the same as when strokes are outputted at step S9 in FIG. 7 if a page number is extracted and outputted from selected key-stroke information. Results of the search are displayed by the display unit 6 in FIG. 1.

Figure 11A:
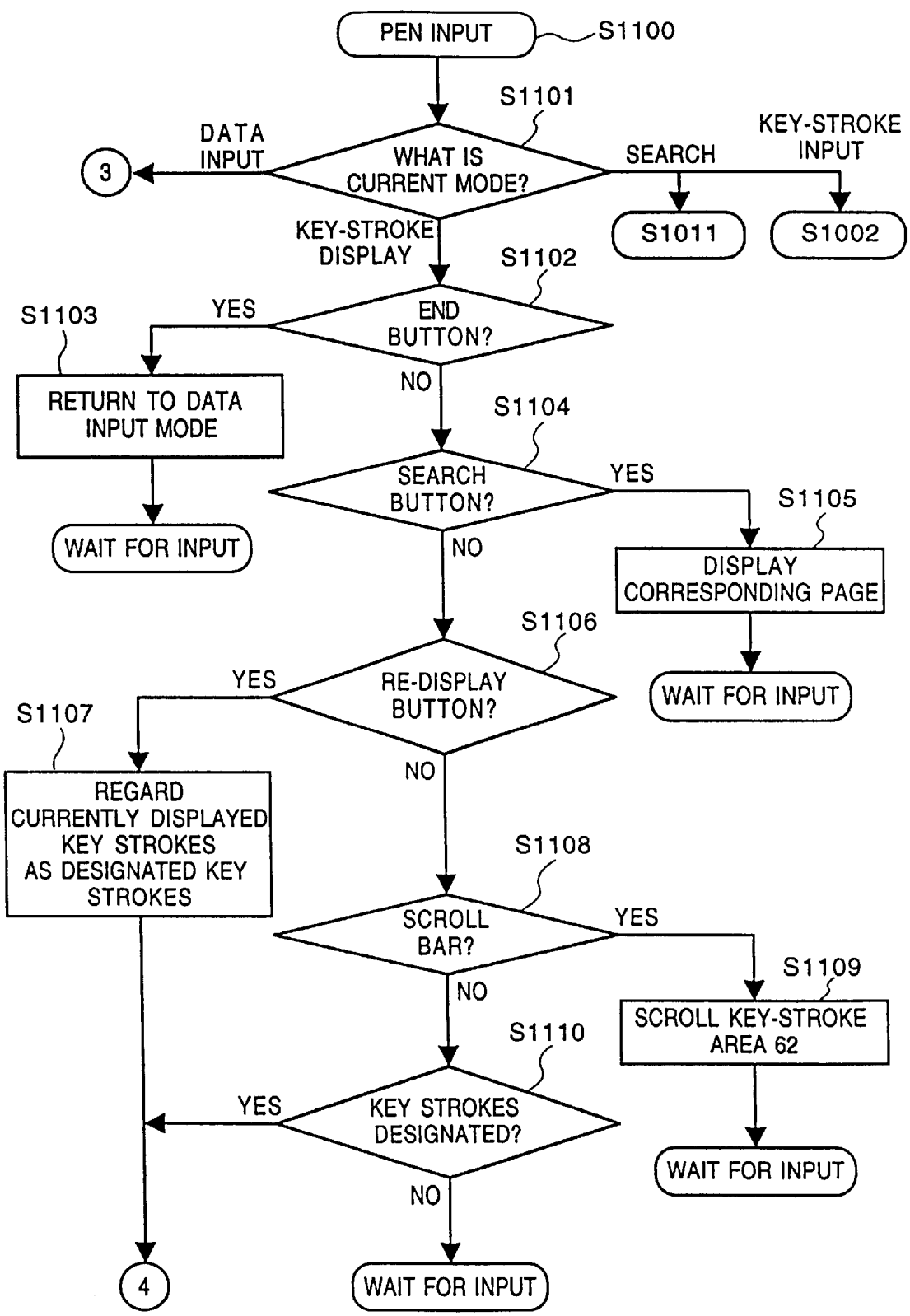
Figure 11B:
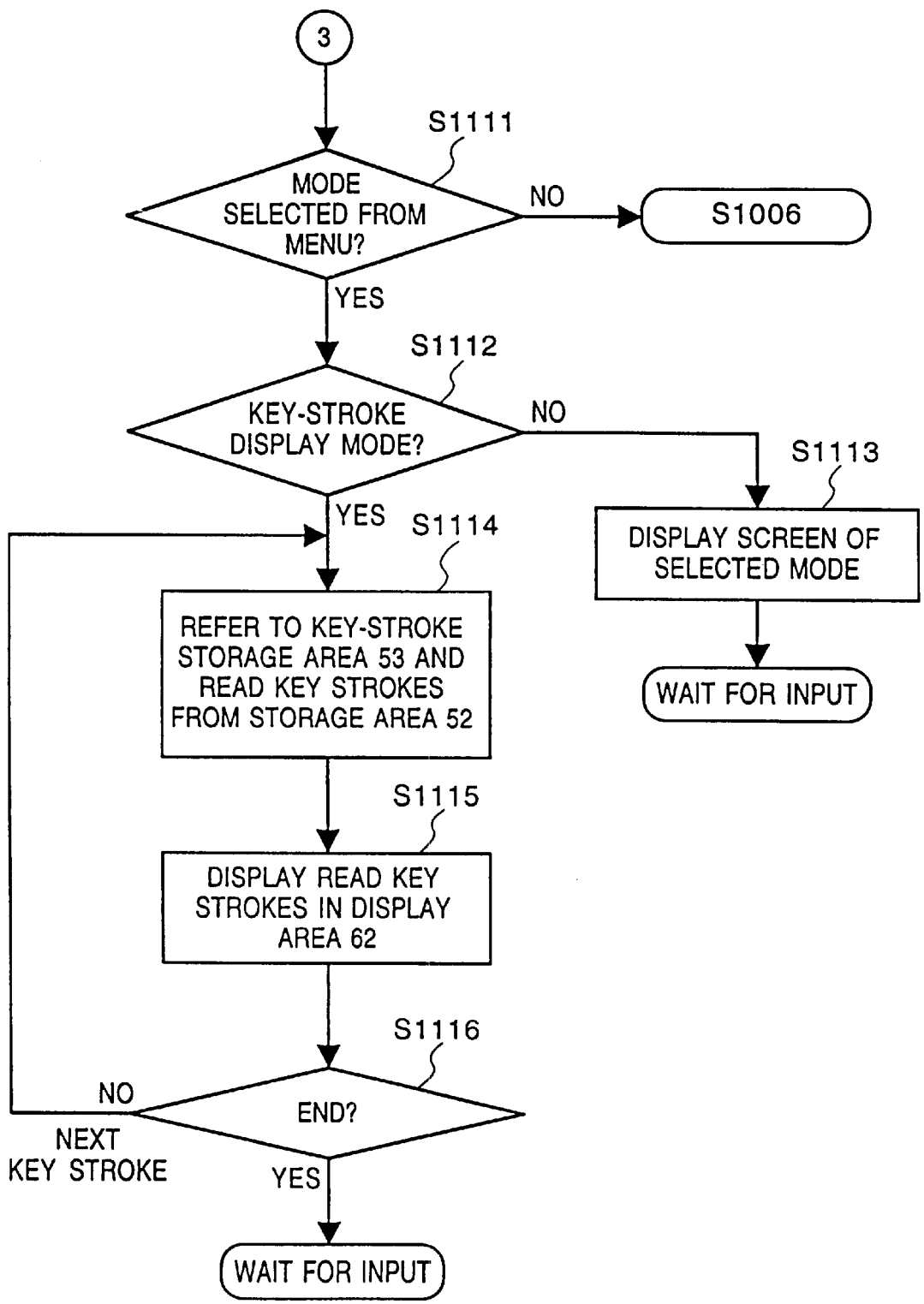

FIGS. 11A~11C are flowcharts illustrating the processing described above. Steps similar to those in FIGS. 10A, 10B are designated by like step numbers and need not be described again.

If there is an input in response to pressing the pen down on the input device, the currently prevailing mode is determined at step S1101. If the current mode is the search mode or key-stroke input mode, processing similar to that of the first embodiment is executed. If the current mode is the data input mode, it is determined at step S1111 in FIG. 11B whether a mode has been selected from the menu. If the answer is "NO", then the program branches to step S1006, where processing the same as that of the first embodiment is executed. If the answer is "YES", on the other hand, it is determined at step S1112 which mode has been selected. If the selected mode is not the key-stroke input mode, then the screens of the respective modes shown in FIGS. 2–4 are displayed at step S1113.

In a case where the key-stroke display mode has been selected, reference is had to the key-stroke storage area 53, the key stroke that has been registered at the beginning of the area is read and the block of the key stroke is read out of the stroke storage area 52 in accordance with the content of the read key stroke. In order to specify a key stroke, the address that has been stored in the page index 51 corresponding to the page number 531 is read. The offset address 53 is added to this address and the address of the key stroke is calculated. From this address, the block whose number is the value of the stroke count 533 is the key stroke.

The key stroke that has been read out is displayed in the display area 62 at step S1115. When the display of one key stroke thus ends, processing is executed in similar fashion with regard to the next key stroke, if any, while the display area is changed.

If the key-stroke input mode is discriminated at step S1101, the program proceeds to step S1102. The type of button that has been pressed is examined from step S1102 onward and the corresponding processing is executed.

If the end button 65 has been pressed, the data input mode is restored at step S1103. If the search button 64 has been pressed, the page corresponding to the selected key stroke is displayed at step S1105. If the re-display button 63 has been pressed, the key stroke being displayed in the display area 61 is regarded as the designated key stroke and the program proceeds to step S117, which is processing for designating a key stroke. If the scroll bar has been moved, the key-stroke display area 62 is scrolled.

In a case where the input is designation of a key stroke in the key-stroke display area 62, the designated key stroke is specified by referring to the key-stroke storage area 53 at step S1117. The key stroke is specified in the same way as at step S1114. If the block corresponding to the key stroke thus designated is changed, each stroke forming the key stroke is displayed at step S1118. Here a time interval of 25 ms is inserted each time a line segment connecting sampling points is displayed.

Whether a stroke contained in a key stroke still remains is determined at step Si119 by referring to the stroke number 533. If a stroke still remains, step S1118 is repeated to display the strokes at intervals of 100 ms.

Thus, all registered key strokes can be displayed and a search stroke can be retrieved from these. With the information device of this embodiment, a group of strokes desired by the operator can thus be used as an index.

Further, the key-stroke storage area 53 may be provided with a flag indicating whether each key stroke is utilized as an index. If the flag is ON, the key stroke is displayed in the manner shown in FIG. 8 in the key-stroke display mode. If the flag is OFF, nothing is displayed. Thus, a setting can be made in such a manner that all key strokes are not displayed.

Figure 12:
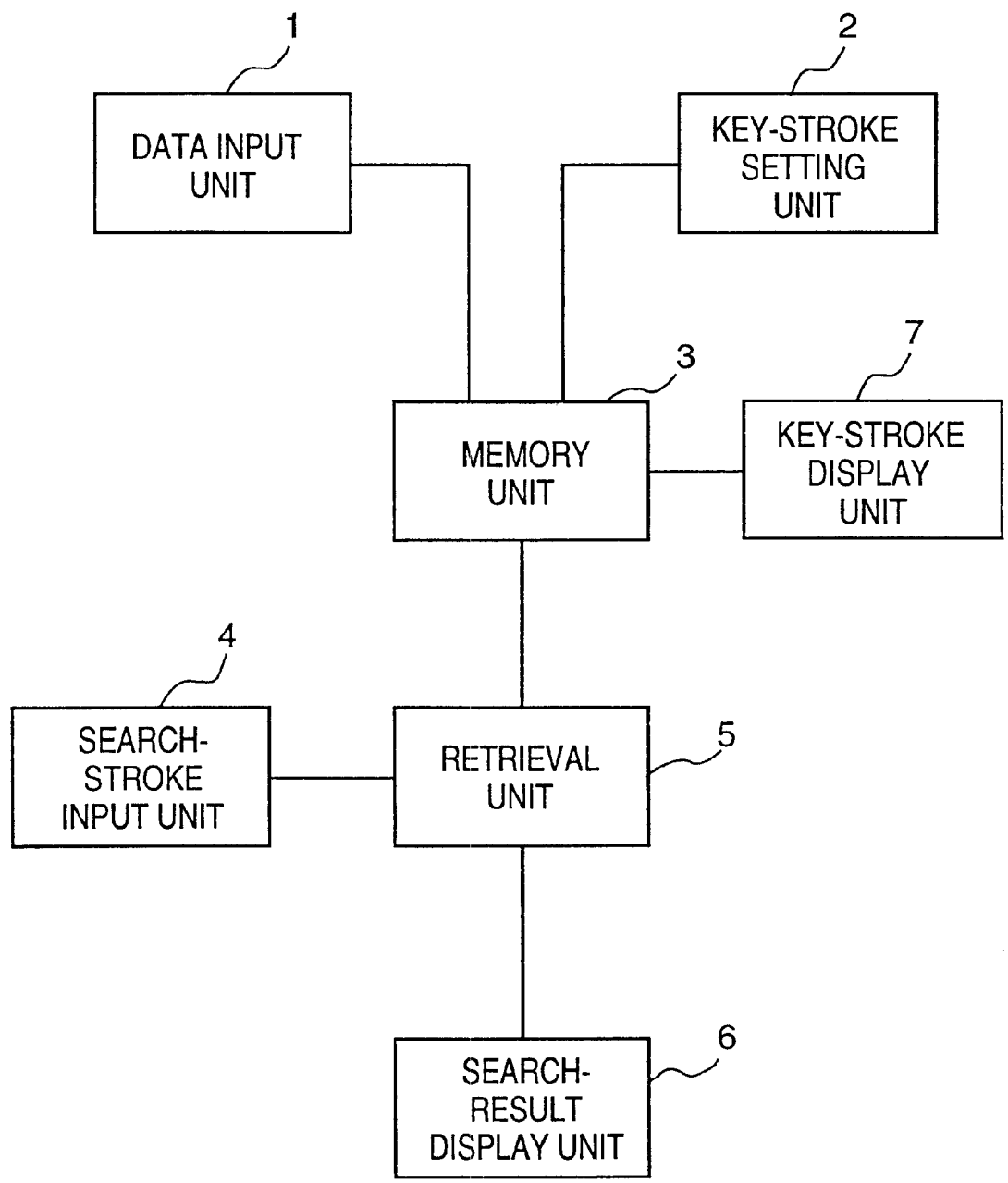
FIG. 12 is a functional block diagram of a second embodiment of the present invention.

FIG. 12 is a functional block diagram of this embodiment. In the arrangement of FIG. 12, the configuration of the first embodiment is additionally provided with a key-stroke display unit 7. The key-stroke display unit 7 reads a key stroke out of the memory unit 3 and displays this key stroke. If a search has been designated, the page corresponding to the selected key stroke is found and this is displayed on the display unit 7.

This embodiment is effective in preventing a situation in which a search cannot be performed because the operator has forgotten the existence of the key stroke or the way in which it was written. Moreover, the embodiment provides a new method of performing a search besides a method which relies upon handwritten entry for retrieval of a key stroke.

In the pen-input information apparatus of this embodiment, as described above, information grouped on a per-page basis can be retrieved by a handwritten stroke. Therefore, in an information apparatus in which entries are made chiefly by handwriting, it is no longer necessary to use handwritten character recognition or keyboard entry. This makes it possible for the user to perform a high-speed search with ease. More specifically, an information apparatus can be provided in which it is possible for a searcher to register his or her own key word and in which the searcher can use a symbol or abbreviated character, which is intuitively easy to remember, as the key word when a search is performed.

Further, since strokes are used instead of a key word, fixed information such as a character code need not be the object of a search. The operator can use a symbol or abbreviated character, which is intuitively easy to remember, as the key stroke. This not only increases the degree of freedom and make operation easier but also makes it possible to designate a key stroke known only to the operator. This feature can be used as a securing function.

Furthermore, since a key stroke to be searched can be selected from a display, the search method is enhanced and key strokes can be confirmed.

The present invention can be applied to a system constituted by a plurality of devices or to an apparatus comprising a single device. Furthermore, it goes without saying that the invention is applicable also to a case where the object of the invention is attained by supplying a program to a system or apparatus. In this case a storage medium storing a program in accordance with the invention constitutes the invention. By reading the program out of the storage medium and into a system or apparatus, the system or apparatus will operate in the predetermined manner.

As many apparently widely different embodiments of the present invention can be made without departing from the spirit and scope thereof, it is to be understood that the invention is not limited to the specific embodiments thereof except as defined in the appended claims.

What is claimed is:

1. A data storage apparatus for storing data entered as handwriting, comprising:

input means for entering page data containing a plurality of strokes and for entering search strokes including one or more strokes;

designation means for designating a rectangular area including one or more strokes in the page data;

key-stroke selecting means for selecting strokes included in the designated rectangular area as key strokes which are subject to retrieval from among the plurality of strokes contained in the page data entered by said input means;

memory means for storing the selected key strokes and the page data;

retrieval means for retrieving key strokes, that match the search strokes entered by said input means, from the selected key strokes stored in said memory means; and first search-result display means for displaying page data corresponding to the key strokes retrieved from said memory means, wherein said retrieval means retrieves the key strokes that match the search strokes by determining whether or not the number of strokes of the search strokes is identical with the number of strokes of the selected key strokes, and in a case that the number of strokes of the search strokes is identical with the number of strokes of the selected key strokes, performing stroke matching between the search strokes and the selected key strokes.

2. The apparatus according to claim 1, wherein said key-stroke selecting means is capable of selecting a plurality of strokes as a key stroke.

3. The apparatus according to claim 1, wherein said input means has a coordinate input device, and said plurality of strokes are represented by a coordinate point sequence arrayed in the form of a time series.

4. The apparatus according to claim 1, wherein said page data contains not only strokes but also other types of information.

5. The apparatus according to claim 1, wherein said input means includes:
 a coordinate input unit for entering a key stroke as a coordinate point sequence; and
 input display means for displaying an entered stroke on a same display surface as that of said search-result display means.

6. The apparatus according to claim 5, wherein said coordinate input unit is transparent, is superimposed upon said display surface, and has the same coordinate system as said display surface.

7. The apparatus according to claim 5, wherein said page data is displayed on one surface of said display surface as a unit.

8. The apparatus according to claim 1, further comprising:
 key-stroke display means for displaying information relating to all key strokes that have been stored in said memory means;
 selecting means for selecting a desired key stroke from key strokes displayed by said key-stroke display means; and
 selected key-stroke display means for displaying the key stroke selected by said selecting means.

9. The apparatus according to claim 8, wherein a stroke is represented by a sequence of coordinate points arrayed in the form of a time series, and, in a case plural strokes are selected as the key stroke, said selected key-stroke display means displays each of the plural strokes at a first predetermined time interval and displays each line segment connecting the coordinate points at a second predetermined time interval in each stroke.

10. A method of retrieving data in a data storage apparatus for storing data entered as handwriting, said method comprising:
 an input step of entering page data containing a plurality of strokes and storing the page data in memory means;
 a second input step of entering search strokes including one or more strokes;
 a designation step of designating a rectangular area including one or more strokes in the page data;
 a key-stroke selecting step of selecting strokes included in the designated rectangular area as key strokes which are subject to retrieval from among the plurality of strokes contained in the page data entered at said first input step and storing the selected key stroke in said memory means;
 a retrieval step of retrieving key strokes, that match the search strokes entered at said second input step, from the selected key strokes stored in said memory means; and
 a first search-result display step of displaying page data corresponding to the key strokes retrieved from said memory means, wherein said retrieval step retrieves the key strokes that match the search strokes by determining whether or not the number of strokes of the search strokes is identical with the number of strokes of the selected key strokes, and in a case that the number of strokes of the search strokes is identical with the number of strokes of the selected key strokes, performing stroke matching between the search strokes and the selected key strokes.

11. The method according to claim 10, wherein said key-stroke selecting step is capable of selecting a plurality of strokes as a key stroke.

12. The method according to claim 10, wherein a stroke is entered by a coordinate input device at said input step, and said plurality of strokes are represented by a coordinate point sequence arrayed in an order in which an input is made.

13. The method according to claim 10, wherein said page data contains not only strokes but also other types of information.

14. The method according to claim 10, wherein a key stroke is entered at said input step by a coordinate input unit for entering a coordinate point sequence, and the entered stroke is displayed on a same display surface as that of said search-result display means.

15. The method according to claim 14, wherein said coordinate input unit is transparent, is superimposed upon said display surface, and has the same coordinate system as said display surface.

16. The method according to claim 14, wherein said page data is displayed on one surface of said display surface as a unit.

17. The method according to claim 10, further comprising:
 a key-stroke display step of displaying information relating to all key strokes that have been stored in said memory means;
 a selecting step of selecting a desired key stroke from key strokes displayed at said key-stroke display step; and
 a selected key-stroke display step of displaying the key stroke selected at said selecting step.

18. The method according to claim 17, wherein a stroke is represented by a sequence of coordinate points arrayed in order in which an input is made, and, in a case plural strokes are selected as the key stroke, said selected key-stroke display step displays each of the plural strokes at a first predetermined time interval and displays each line segment connecting the coordinate points at a second predetermined time interval in each stroke.

19. A data storage apparatus for storing data entered as handwriting, comprising:
 a processor;
 a display unit;
 a coordinate input unit;
 a data memory for storing input data; and
 a program memory for storing a program executed by said processor, wherein said program memory includes:
  a program code of an input step of entering data containing a plurality of strokes and storing the stroke data in said data memory in individual groups of predetermined units;
  a program code of a second input step of entering search strokes including one or more strokes;
  a program code of a designation step of designating a rectangular area including one or more strokes in the page data;

a program code of a key-stroke selecting setting step of selecting strokes included in the designated rectangular area as key strokes which are subject to retrieval from among the plurality of strokes contained in the page data entered at said first input step and storing the key stroke in said data memory group by group;

a program code of a retrieval step of retrieving key strokes that match the search strokes entered at said second input step, from the selected key strokes stored in said data memory; and a program code of a first search-result display step of displaying page data corresponding to the key strokes retrieved at said retrieval step, wherein said retrieval step retrieves the key stroke that match the search strokes by determining whether or not the number of strokes of the search strokes is identical with the number of strokes of the selected key strokes, and in a case that the number of strokes of the search strokes is identical with the number of strokes of the selected key strokes, performing stroke matching between the search strokes and the selected key strokes.

20. The apparatus according to claim 19, wherein said program memory further includes:

a program code of a key-stroke display step of displaying information relating to all key strokes that have been stored in said data memory;

a program code of a selecting step of selecting a desired key stroke from key strokes displayed at said key-stroke display step; and a program code of a second search-result display step of displaying stroke data contained in a group corresponding to the key stroke selected at said selecting step.

* * * * *

UNITED STATES PATENT AND TRADEMARK OFFICE
CERTIFICATE OF CORRECTION

PATENT NO. : 6,373,473 B1 Page 1 of 1
DATED : April 16, 2002
INVENTOR(S) : Katsuhiko Sakaguchi et al.

It is certified that error appears in the above-identified patent and that said Letters Patent is hereby corrected as shown below:

Title page,
Item [75], Inventors, "Keiji Takasu" should read -- Eiji Takasu --.
Item [56], References Cited, U.S. PATENT DOCUMENTS, insert the following:
-- 4,972,496   11/1990   Sklarew
   5,260,697   11/1993   Barrett et al.
   5,287,415    2/1994   Chefalas et al. --.

Column 10,
Line 19, " "b 0"." should read -- "0". --.

Column 11,
Line 44, "Si119" should read -- S1119 --.

Signed and Sealed this

Ninth Day of December, 2003

JAMES E. ROGAN
*Director of the United States Patent and Trademark Office*